United States Patent [19]

Lipsch et al.

[11] Patent Number: 5,547,697
[45] Date of Patent: Aug. 20, 1996

[54] ZERO FAT WHIPPED FROZEN DESSERT PRODUCT

[75] Inventors: Michael H. Lipsch, Beusichem; Marinus J. Van Beek, Maarssen; John S. Fung Kon Yin, Zwijndrecht, all of Netherlands

[73] Assignee: Unilever Patent Holdings B.V., Vlaardingen, Netherlands

[21] Appl. No.: 347,423

[22] PCT Filed: May 18, 1993

[86] PCT No.: PCT/EP93/01275

§ 371 Date: Jan. 23, 1995

§ 102(e) Date: Jan. 23, 1995

[87] PCT Pub. No.: WO93/24019

PCT Pub. Date: Dec. 9, 1993

[30] Foreign Application Priority Data

May 22, 1993 [EP] European Pat. Off. .............. 92201482

[51] Int. Cl.$^6$ ..................................... A23G 9/02
[52] U.S. Cl. .................... 426/565; 426/804; 426/548
[58] Field of Search ..................... 426/804, 572, 426/548, 570, 564, 565, 566, 567, 613

[56] References Cited

U.S. PATENT DOCUMENTS 3,475,182 10/1969 Goodman et al. ............... 426/565
4,127,679 11/1978 Amano et al. ................... 426/565
4,400,405  8/1983 Morley ............................ 426/565
4,435,439  3/1984 Morris ............................. 426/565
4,631,196 12/1986 Zeller .............................. 426/580
5,082,682  1/1992 Peterson ......................... 426/564

FOREIGN PATENT DOCUMENTS 220836  5/1987 European Pat. Off. .
 308091  3/1989 European Pat. Off. .
1547965 11/1968 France .
2124067  2/1984 United Kingdom .
 909107  8/1990 WIPO .

OTHER PUBLICATIONS

Database WPIL, week 8929, Derwent Publications Ltd., London, GB; AN 89–212238, (Anonymous) 10 Jun. 1989 see abstract & RD 302092.

Primary Examiner—Jeanette Hunter
Attorney, Agent, or Firm—Cushman Darby & Cushman

[57] ABSTRACT

The invention relates to zero fat whipped frozen dessert products. Such products can be regarded as a low calorie alternative for ice cream. More in particular, the invention relates to zero fat whipped frozen dessert products having improved melting properties. Products showing a controlled melting behavior were obtained by using a specific emulsifier blend.

18 Claims, 2 Drawing Sheets

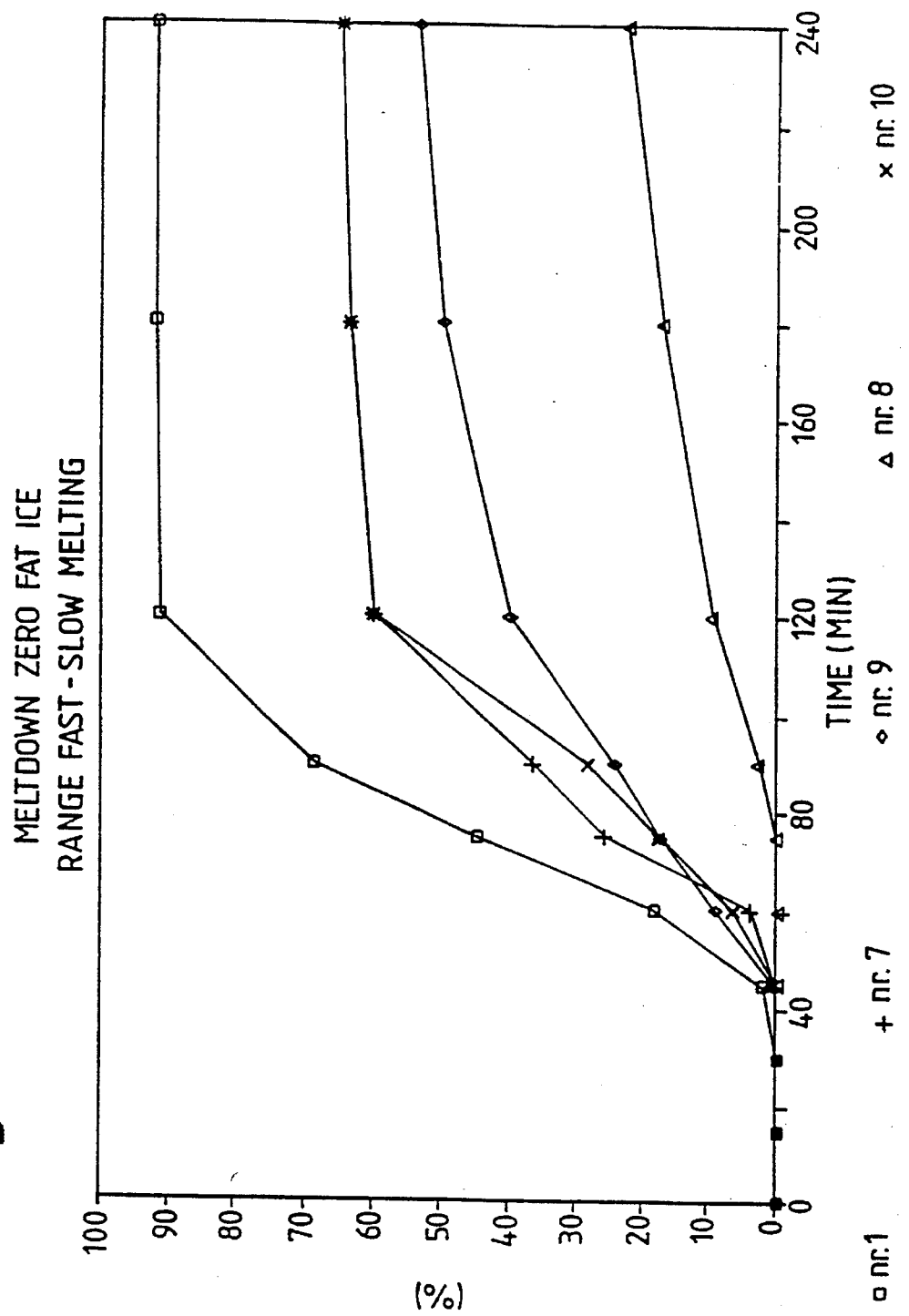

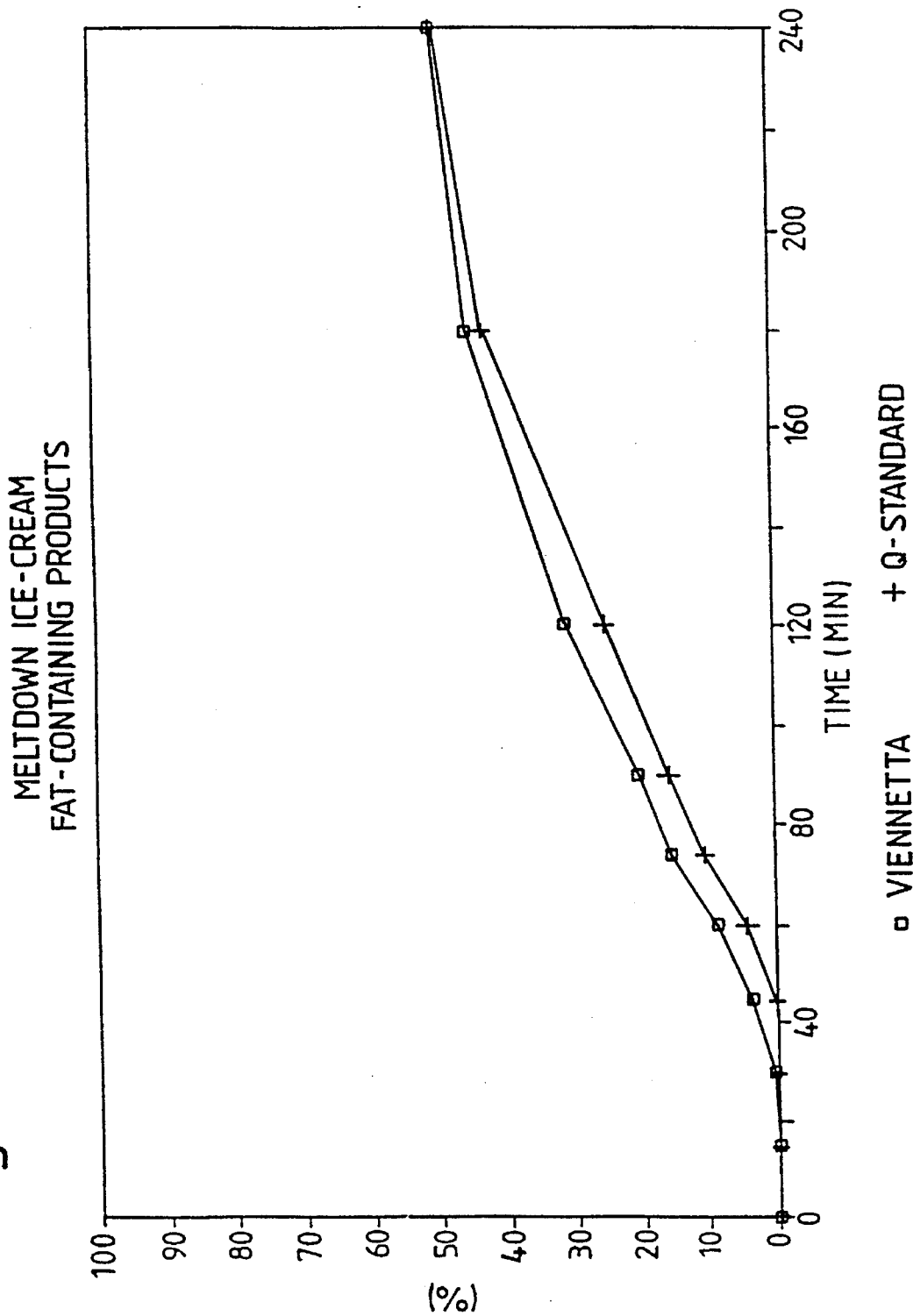

ZERO FAT WHIPPED FROZEN DESSERT PRODUCT

The present invention relates to a zero fat whipped frozen dessert product. Such a type of product is generally known as a reduced calorific value substitute for ice cream. More specifically, the present invention relates to a zero fat whipped frozen dessert product showing improved melting properties.

BACKGROUND OF THE INVENTION

Conventional ice cream and related products contain a substantial amount of fat (generally 8–14% by weight). Furthermore, they generally contain proteins (3–8%) and sugars (12–20%). Fat is herein to be understood to mean triglycerides. Minor ingredients generally present are stabilizers, emulsifiers, flavours and colorants. Such a conventional ice cream product has large calorific value mainly due to the presence of fat and sugars.

Fat plays an important role in ice cream. It is generally known to the man skilled in the art that fat droplets or globules (partially coated with emulsifiers and proteins) are of prime importance for the stability and structure of ice cream. This structure can be considered to comprise air bubbles fixed in a matrix of solids and partially frozen liquids and emulsions. It is preferred for a good structure and stability that a part of said fat droplets are agglomerated or destabilized. These agglomerates are formed during processing of the ice cream emulsion. The destabilization of the fat droplets is a very critical process, depending on e.g. process conditions and amount and type of fat, proteins and emulsifiers used. The chances of getting too much agglomeration (resulting in an oily oral sensation upon eating) or no agglomeration at all (resulting in a poor structure of the ice cream) are considerable. Not only the structure of the ice cream is determined by the agglomeration, but also the melting behaviour is strongly influenced by it. It is desired that ice cream does not melt away too quickly, but it is also desired that melting does occur when the ice cream is exposed to elevated temperatures, otherwise the product will result in a mousse, which is a different product. Therefore, it is desired that ice cream exhibits a gradual or controlled melting behaviour when exposed to elevated temperatures, especially in the mouth upon eating. Melting behaviour of ice cream and related products can suitably be determined by using a standard melting test as disclosed by Arbuckle in "Ice Cream", The Avi Publishing Co. 4th edition page 364 (1986).

As stated above, among the factors having an influence on the agglomeration of fat droplets are fat and its interaction with emulsifiers. Although there are a number of suitable food grade emulsifiers, fatty acid monoglyceride esters (for short: monoglycerides) are commonly used. There is, however, a specific class of monoglyceride emulsifiers which, when present to a certain extent, enhances the agglomeration or destabilization of fat and thereby influences the melting behaviour of the ice cream. Said specific emulsifiers are monoglycerides of unsaturated fatty acids, or for short: unsaturated monoglycerides.

The degree of saturation of fatty acids and derivatives thereof like mono- and diglyceride esters is normally quantified by the iodine value (IV). It is common practice to regard fatty acids or derivatives thereof having an IV of larger than 3 as being at least partly unsaturated. Partly is herein to be understood as a mixture of saturated and (mono- or poly-) unsaturated fatty acids or derivatives thereof.

The effect of unsaturated fatty acid monoglycerides on the emulsifying of fat in ice cream and its subsequent effect on fat agglomeration and thus on the melting behaviour and related organoleptic properties is discussed in a number of references, e.g. by J. J. Kloser and P. G. Keeney in "The ice cream journal" of May 1959 (page 26–121), by K. Sistrup in Süsswaren, 14, 695–699 (1970), by H. Amano et al. in U.S. Pat. No. 4,127,679 (1978), by Y. K. Cho in the Korean J. Food Sci. Technol. 20(2) 236–241 (1988), by H. D. Goff and K. Jordan in J. of Dairy Sci. 72, 18–29 (1989) and by N. M. Barford et al. in Fat Sci. Technol. 93(1), 24–29 (1991). All these references relate to ice cream having a substantial amount of fat.

Since the beginning of the 1980s, there is an increasing demand for confectionary products and desserts, including ice cream and related products, having a reduced calorific value. A common way of achieving this is by reducing the amount of fats and/or carbohydrates present and/or by replacement of these compounds with materials resembling the properties of fat or carbohydrates, but not having the same amount of calories. Reducing the amount of fat present in ice cream is a most effective way for reducing the calorific value, since fat has a calorific value per gram which is more than twice as high as the value for carbohydrates. The amount of fat present in ice cream may be lowered to about 3 to 5% while it is still able to perform it stabilizing action on the aerated mix and thus maintaining acceptable melting properties. By reducing the amount of fat in ice cream, further, however, considerable difficulties arise, because fat cannot play its important role in connection to structure and melting behaviour, as is described above. These difficulties rise to enormous problems when substantially all fat is omitted from ice cream, which is the object when producing an ice cream like product having a reduced amount of calories. Such a product can better be described as a zero fat whipped frozen dessert product.

This means that a considerable problem is encountered when trying to make a zero-fat whipped frozen dessert having a controlled melting behaviour when exposed to elevated temperatures.

One way of solving this problem is by using a fat-simulating material having zero calories. Such a solution is disclosed by Whelan et al. in the patent application published as WO 91/11109. Herein it is shown that polyol fatty acid polyesters having at least 4 fatty acid ester groups can replace fat (i.e. triglycerides) in conventional ice cream and thus maintaining good organoleptic properties. Use of such a material, however, has the considerable disadvantage of having either an undesirable laxative effect or giving a waxy feeling in the mouth.

In U.S. Pat. No. 4,400,405 by Morley et al. zero-fat whipped frozen dessert products for soft serve purposes at home freezer temperatures are disclosed. This is achieved by using specific sugars and related compounds which are known to have a softening effect on ice cream, such as dextrose, fructose, glycerol, sorbitol and high fructose syrups. Emulsifiers used for the products according to the reference are mono- and diglycerides. The only mono- and diglycerides which are specified have saturated fatty acid chains. The product according to the reference does not exhibit controlled melting behaviour.

SUMMARY OF THE INVENTION

Therefore, there is a need for a zero-fat whipped frozen dessert product showing controlled melting whilst at the same time having a good mouthfeel, texture and creaminess.

It has now been found that a zero-fat whipped frozen dessert product having melting properties which are more tending towards those of full-fat ice-cream than the fast melting previously associated with zero-fat whipped frozen dessert products can be obtained by incorporating in the zero fat whipped frozen dessert product an emulsifier which comprises at least 20% by weight (on total emulsifier) fatty acid monoglycerides and at least 10% by weight (on total emulsifier) fatty acid diglycerides and which emulsifier has an iodine value larger than 3. Furthermore, the products according to the invention show pleasant mouthfeel, texture and creaminess.

DETAILED DESCRIPTION OF THE INVENTION

A zero fat whipped frozen dessert product according to the invention will have a composition as outlined below:

a) milk solids not fat (MSNF), whey solids or mixtures thereof b) carbohydrates, sugar alcohols or mixtures thereof c) stabilizer d) from 0.1 to 3% by weight emulsifier e) water.

A product according to the above formulation, will, when processed in a conventional way, show controlled melting when an emulsifier is used as specified above. This controlled melting behaviour means that the product, when exposed to elevated temperatures, neither melts away quickly nor that the products melts too slowly. This means that a gradual melting is obtained. The melting behaviour can suitably be shown in graphs according to the examples.

It is preferred that the emulsifier has an iodine value of at least 6. It is even more preferred that the emulsifier has an iodine value of at least 10.

The term "emulsifier" is intended to include mixtures of different emulsifying compounds. For said purpose it is generally preferred that the emulsifier comprises at least 40% by weight fatty acid monoglyceride esters and at least 20% by weight fatty acid diglyceride esters. Suitable fatty acids for the mono- and diglycerides emulsifier may have C16 or C18 chains. Adequate amounts for the emulsifier are 0.1–3% by weight, but more preferred is 0.5–1.2% by weight of emulsifier. Apart from the said mono- and diglycerides other emulsifiers having ester linked fatty acids (which may also be (partly) unsaturated) as well as emulsifiers not having ester linked fatty acids may also be present, like lecithin and egg-yolk. For some purposes it may be preferred that at least 0.3% by weight monoglycerides is present in the product, based on the total weight of the final product.

A preferred amount for MSNF or other proteins is from 5–20% by weight, more preferably 8–17% by weight, most preferably from 10–14% by weight.

Stabilizers are generally considered to include (but are not limited to) polysaccharides such as locust bean gum-, guar gum, tara gum, xanthan gum or other gums as well as cellulose ethers like CMC or gelling agents such as gelatin, agar, pectin, alginates, carrageenan or mixtures thereof.

It is preferred that 0.1–5% by weight of stabilizer is used for the product disclosed herein, it is even more preferred that 0.2–1% by weight of stabilizer is used.

The product according to the invention may also comprise other proteins than included in milk solids not fat or whey solids. These other proteins may be used to replace wholly or partially the proteins from sources mentioned above. Suitable other proteins are whey proteins which may be (partially) hydrolysed or physically modified as well as vegetable proteins, such as e.g. soy protein. It may be desired that at least a part of the lactose included in the MSNF or whey used for the formulation is hydrolysed to the monosaccharides. This may be preferred for improving the sweetness or for making products suitable for those having a lactose intolerance.

Preferred amounts of carbohydrates or sugar alcohols used may range from 5–30% by weight, more preferred amounts are 5–24% by weight. It is preferred that at most 80% by weight of the carbohydrates used are sweet tasting carbohydrates. Carbohydrates are to be understood herein to be various mono-, di-, tri- and oligosaccharides as well as the higher saccharides like inulin, polydextrose, polyfructose, (malto)dextrins and starches. Sweet tasting carbohydrates are herein to be understood to be mono-, di-, and trisaccharides generally known for their ability to impart a sweet taste to food stuffs. The carbohydrates employed may partly or completely be replaced by sugar alcohols like sorbitol, xylitol, mannitol, lactitol and the like.

For further reducing the calorific value of the product it may be desired to replace part of the carbohydrates with known low calory artificial sweeteners, these compounds may also be added for further improving the taste.

Minor ingredients like flavours and colorants may be present in suitable amounts, other ingredients known to be present in some ice creams may also be included in the product according to the invention, for example fruit products such as juices, puree or pieces, nuts, cereals, chocolate, cocoa powder and the like.

Water may be chosen as a suitable liquid for the preparation of the emulsion preceding the whipped frozen dessert product, but any other water containing liquid may also be used, such as whey, skimmed milk or fermented milk products like yoghurt. The emulsion and the zero fat whipped frozen dessert product can be obtained by conventional processing.

For the purpose of this invention, the following definitions are given. With respect to the product, "fat" is herein to be understood to be triglycerides. The term "zero fat" as used herein is intended to mean that no fat is intentionally added to the whipped frozen dessert product and the ingredients used herein are substantially fat free. Nevertheless, minor amounts of fat may still be present in the ingredients used, e.g. traces of fat may remain in the milk solids not fat. It is also possible that small amounts of triglycerides are present in the mono- and diglyceride emulsifier mixtures used. Typical amounts of triglycerides present in the zero-fat whipped frozen dessert products according to the invention are below 1% and preferably below 0.5%. The product is preferably substantially free of lipophilic fat substitutes such as polyol fatty acid polyesters.

DETAILED DESCRIPTION OF THE DRAWINGS

FIG. 1 represents a meltdown graph for zero fat whipped frozen dessert products according to formulas 1, 7, 8, 9 and 10 of Table 1 in the examples.

FIG. 2 represents a meltdown graph for two conventional, fat containing ice creams as described in the examples.

The invention is illustrated by the following examples but is in no way limited thereto.

Zero fat whipped frozen dessert products were prepared according to the following recipe (percentages by weight):

skimmed milkpowder 12%
sugars 22%
stabilizer blend 0.35%
emulsifier(s) 0.6–1%
vanilla/cream flavour 0.3–0.4%
colour 0.0325%
water up to 100%

The emulsifiers used are set out in table 1.
The stabilizer blend consisted of:
0.2% Locust bean gum 9157*
0.1% CMC 9200*
0.05% Carrageenan 9156*.

* a product as marketed by Quest International B.V., Naarden, the Netherlands.

Processing of the mixture was as follows:

disperse/dissolve ingredients in cold water heat mix to about 70° C.

homogenise at about 200 bars pasteurise (30 sec. 82° C.)

cool to about 5° C.

store overnight at about 5° C.

aerate up to an overrun of approximately 100% and freeze in continuous freezer.

In table 1 below the melting results for zero fat whipped frozen dessert products using different mixtures of emulsifier (examples 1–11) are set out. Melting behaviour was tested using a test comparable to the one described by Arbuckle in "Ice Cream" The Avi Publishing Co. 4th edition page 364 (1986). Measured, however, was not a loss in volume but a loss in weight of a 250 ml sample when subjected to the test. Measurements took place at about 20° C., after pre-tempering the samples at −20° C. In table 1, MG relates to various Admul type emulsifiers, HYM relates to various Hymono type emulsifiers, both Admul and Hymono are commercially available emulsifiers. All emulsifiers used in the examples mainly comprise mono- and diglycerides. For five of the experiments (nr. 1, 7, 8, 9 and 10) the melting behaviour is set out in FIG. 1. The melting behaviour of the zero fat whipped frozen dessert products as in FIG. 1 can be compared to the melting behaviour of two conventional, fat containing ice cream products as set out in FIG. 2. Ice creams tested were Viennetta, about 9% fat and a standard vanilla type ice cream (Q-standard in FIG. 2) having a fat content of about 10%. In table 1, the denominations regarding the melting behaviour (i.e. fast, slightly retarded, retarded and slow) should be considered as being relative descriptions (i.e. compared to each other). How the actual melting behaviour is can be best seen from the graph in FIG. 1.

We claim:

1. A zero fat whipped frozen dessert product comprising:
   a) 5–20% by weight milk solids not fat (MSNF), whey solids or mixtures thereof
   b) 5–30% by weight carbohydrates, sugar alcohols or mixtures thereof
   c) 0.1–5% by weight stabilizer
   d) from 0.1 to 3% by weight emulsifier
   e) water,
   wherein the emulsifier comprises at least 20% by weight fatty acid monoglycerides and at least 10% by weight fatty acid diglycerides and wherein the emulsifier has an iodine value larger than 3.

2. A product according to claim 1, characterized in that the emulsifier has an iodine value of at least 6.

3. A product according to claim 2, characterized in that the emulsifier has an iodine value of at least 10.

4. A product according to claim 1, characterized in that the emulsifier comprises at least 40% by weight fatty acid monoglyceride esters.

5. A product according to claim 1, characterized in that the emulsifier comprises at least 20% by weight fatty acid diglyceride esters.

6. A product according to claim 1, characterized in that it comprises 0.5–1.2% by weight emulsifier.

7. A product according to claim 1, characterized in that it comprises from 5 to 24% by weight carbohydrates, sugar alcohols or mixtures thereof.

8. A product according to claim 1, characterized in that at most 80% by weight of the carbohydrates are sweet tasting carbohydrates.

9. A product according to claim 1, characterized in that it comprises 0.2–1% by weight of stabilizer.

10. A product according to claim 1, characterized in that the stabilizer comprises a compound from the group locust bean gum, guar gum, tara gum, xanthan gum, carrageenan, gelatin, agar, pectin, alginates, cellulose esters such as CMC or mixtures thereof.

11. A product according to claim 1, characterized in that it comprises whey proteins.

12. A product according to claim 1, characterized in that it comprises vegetable proteins.

13. A product according to claim 1, characterized in that at least a part of the lactose present in the MSNF or whey solids is hydrolysed.

14. A product according to claim 1, characterized in that it comprises flavours and colorants.

15. A product according to claim 1, characterized in that it comprises a reduced calory artificial sweetener.

16. A product according to claim 1, characterized in that the sugar alcohol is sorbitol or lactitol.

17. A product according to claim 1, characterized in that it is substantially free of lipophilic fat substitutes.

18. A product to claim 1, characterized in that it comprises at most 1%, preferably at most 0.5% by weight of triglycerides.

* * * * *